United States Patent
Park et al.

(10) Patent No.: US 7,991,884 B2
(45) Date of Patent: Aug. 2, 2011

(54) METHOD FOR PROCESSING DATA TO CHECK AN INTERACTIVE COMMUNICATION SEQUENCE AND SYSTEM THEREOF

(75) Inventors: Man Ho Park, Daejeon (KR); Song In Choi, Daejeon (KR); Jee Hwan Ahn, Daejeon (KR); Byung Wan Lim, Seoul (KR); Ji Hwan Song, Seoul (KR); Myoung Ho Kim, Daejeon (KR)

(73) Assignees: Electronics and Telecommunications Research Institute, Daejon (KR); Korea Advanced Institute of Science and Technology, Daejeon (KR)

( * ) Notice: Subject to any disclaimer, the term of this patent is extended or adjusted under 35 U.S.C. 154(b) by 239 days.

(21) Appl. No.: 12/337,278

(22) Filed: Dec. 17, 2008

(65) Prior Publication Data

US 2009/0157681 A1 Jun. 18, 2009

(30) Foreign Application Priority Data

Dec. 17, 2007 (KR) ........................ 10-2007-0132629
Sep. 16, 2008 (KR) ........................ 10-2008-0090767

(51) Int. Cl.
*G06F 15/173* (2006.01)
(52) U.S. Cl. ......... 709/224; 709/223; 709/227; 709/228
(58) Field of Classification Search ............ 379/112.01; 709/223, 224, 227, 228; 714/736; 370/395.52, 370/280; 380/251; 725/117
See application file for complete search history.

(56) References Cited

U.S. PATENT DOCUMENTS

| 5,228,026 | A | * | 7/1993 | Albrow et al. ................ 370/280 |
| 2001/0012345 | A1 | * | 8/2001 | Nolting et al. ........... 379/112.01 |
| 2005/0034042 | A1 | * | 2/2005 | Davies et al. ................ 714/736 |
| 2005/0271062 | A1 | * | 12/2005 | Ezumi et al. ............. 370/395.52 |
| 2006/0093142 | A1 | * | 5/2006 | Schneier et al. ............. 380/251 |

(Continued)

FOREIGN PATENT DOCUMENTS

JP 05-236009 9/1993

(Continued)

OTHER PUBLICATIONS

Rakesh Agrawal, et al., "Mining sequential patterns" Proc. 11th Int. Conf. on Data Engineering, ICDE, 1995 (Total 24 pages).

(Continued)

*Primary Examiner* — Le Luu
(74) *Attorney, Agent, or Firm* — Staas & Halsey LLP

(57) ABSTRACT

The present invention relates to a data processing method and system for checking an interactive communication sequence (ICS) relating to a plurality of users in a communication record by using a variable time window, and checking an interactive communication sequence pattern (ICSP) that is a frequently generated interactive communication sequence from among the checked interactive communication sequences. The data processing method includes: (a) storing an inverse pair in a communication record in an interactive communication sequence set or a candidate set that is a set of inverse pairs that can be part of the interactive communication sequence; (b) generating an interactive communication sequence having a length other than 1 by combining interactive communication sequences included in the interactive communication sequence set; and (c) generating an interactive communication sequence having a length other than 1 by combining the inverse pair included in the candidate set and one of the interactive communication sequence included in the interactive communication sequence set of (a) and the interactive communication sequence generated in (b).

18 Claims, 8 Drawing Sheets

U.S. PATENT DOCUMENTS

2007/0124789 A1*  5/2007  Sachson et al. ............... 725/117

FOREIGN PATENT DOCUMENTS

| JP | 08-263216 | 10/1996 |
|---|---|---|
| KR | 10-2007-0013442 | 1/2007 |
| KR | 10-2007-0035300 | 3/2007 |

OTHER PUBLICATIONS

Rakesh Agrawal, et al., "Fast algorithms for mining association rules" Proc. 20th Int. Conf. Very Large Data Bases, VLDB, 1994 (pp. 487-499).

Mohammed J. Zaki, "SPADE: An Efficient Algorithm for Mining Frequent Sequences". Machine Learning Journal, 2001 (pp. 31-60).

Akihiro Inokuchi, et al., "An apriori-based algorithm for mining frequent substructures from graph data" Principles of Data Mining and Knowledge Discovery: 4th European Conference, PKDD 2000 (Total 11 pages).

Michihiro Kuramochi, et al., "Frequent Subgraph Discovery" First IEEE International Conference on Data Mining, ICDM 2001 (pp. 313-320).

Xifeng Yan, et al., "gSpan: Graph-based substructure pattern mining" Proc. 2002 Int. Conf. on Data Mining, ICDM, 2002 (pp. 721-724).

* cited by examiner (a) A communication (b) Inverse pair
($t_1 < t_2$ and $t_2 - t_1 < W_{max}$)

(c) Inverse communications
($t_1 < t_2 < t_3$, $t_2 - t_1 < W_{max}$)
and $t_3 - t_1 < W_{max}$)

(a) IC : $t_2 - t_1 \leq W = \alpha$ (b) ICS : $W = 2\alpha$

METHOD FOR PROCESSING DATA TO CHECK AN INTERACTIVE COMMUNICATION SEQUENCE AND SYSTEM THEREOF

CROSS-REFERENCE TO RELATED APPLICATION

This application claims priority to and the benefit of Korean Patent Applications No. 10-2007-0132629 filed in the Korean Intellectual Property Office on Dec. 17, 2007 and No. 10-2008-0090767 filed on Sep. 16, 2008, the entire contents of which are incorporated herein by reference.

BACKGROUND OF THE INVENTION (a) Field of the Invention

The present invention relates to a data processing method and system for checking an interactive communication sequence (ICS) relating to a plurality of users from communication records by using a variable time window, and checking an interactive communication sequence pattern (ICSP) that is a frequently generated interactive communication sequence from the checked interactive communication sequence.

This work was supported by the IT R&D program of MIC/IITA [2006-S-009-02: The Development of Wibro Service and Operating Standard].

(b) Description of the Related Art

With the increase of Internet-based communication services, these services have been used for conspiracy of crime, strangulation, and abetment, and the usage ratio thereof has also been increasing. Differing from the existing public switched telephone networks, computer networks all over the world are freely connected with each other through the Internet, and messages are transferred on the Internet through the packet switching method based on the standardized Internet protocol.

Because of the Internet's packet switching characteristic, messages relating to crimes are mixed with general messages and they are difficult to be distinguished on the Internet. Also, a routing path for the message is dynamically varied depending on the network states (e.g., bandwidth, delay, number of hops, communication cost, load, and reliability), and the contents included in the packet are encrypted according to their application.

Due to these characteristics, it is not easy for law enforcement agencies (LEA's) (e.g., prosecutors or police) to find criminal communication operations from among the Internet-based communication operations.

Many countries have instituted laws to enable communication records to be taken in custody so as to easily and legally intercept Internet-based communication services. Taking communication records in custody represents the storing of call detail records (CDR) for a predetermined time frame or Internet protocol detail records (IPDR).

That is, it means storing records on the telephone callers, call receivers, calling dates, call receiving dates, email senders, email receivers, email sending and receiving dates, web page accessing users, and web page accessing dates. In general, communication contents are excluded from the storage of communication records. The stored communication records can be used by the LEA to investigate crimes.

Methods for the LEA to extract desired information from the communication records include the frequent item set mining, sequential pattern mining, and sub-graph pattern mining.

The frequent item set mining scheme is to collect information on goods that are simultaneously bought by clients at a shop, and to find a buying pattern that is given by common goods buying information of a large volume of clients. The sequential pattern mining scheme is to find a goods buying sequence that appears in common in many clients from goods buying history data of a large volume of clients. Also, the sub-graph pattern mining scheme is to find a sub-graph that is frequently generated in common in a graph-type data set.

However, these conventional schemes are inappropriate for extracting an interactive communication sequence pattern, that is, a communication pattern that is frequently generated from the communication records since the schemes have different data characteristics, access methods, and time problems to be considered.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a data processing method and system for checking an interactive communication sequence (ICS) for a plurality of users from communication records by using a variable time window, and checking an interactive communication sequence pattern (ICSP) that is an interactive communication sequence frequently generated from among the checked interactive communication sequence.

An exemplary embodiment of the present invention provides a method for processing data including: (a) storing an inverse pair in a communication record in an interactive communication sequence set or a candidate set that is a set of inverse pairs that can be part of the interactive communication sequence; (b) generating an interactive communication sequence having a length other than 1 by combining interactive communication sequences included in the interactive communication sequence set; and (c) generating an interactive communication sequence having a length other than 1 by combining the inverse pair included in the candidate set and one of the interactive communication sequence included in the interactive communication sequence set of (a) and the interactive communication sequence generated in (b).

Another embodiment of the present invention provides a method for processing data including: (a) extracting an inverse pair provided in a communication record, determining whether a response time of the inverse pair is less than a basic time window, and extracting an interactive communication sequence having the length 1; (b) extracting an interactive communication sequence having the length other than 1 by combining the inverse pairs while the time window is not extended; (c) extracting an interactive communication sequence having the length other than 1 by extending the time window and combining the inverse pairs; and (d) extracting an interactive communication sequence pattern (ICSP) that is a frequently generated interactive communication sequence based on numbers of times of respectively repeating interactive communication sequences that are extracted in (a), (b), and (c).

Yet another embodiment of the present invention provides a system for processing data including: a set generator for generating an interactive communication sequence set that is a set of interactive communication sequences (ICS's) and a candidate set that is a set of inverse pairs that can be part of the interactive communication sequence by using an inverse pair provided in a communication; an ICS extractor for generating an interactive communication sequence having the length other than 1 based on the interactive communication sequence set and the candidate set generated by the set generator; and an ICSP checker for extracting an interactive communication sequence pattern (ICSP) that is a frequently generated interactive communication sequence from among interactive communication sequences generated by the ICS extractor.

According to the present invention, a data processing method and system for checking an interactive communication sequence (ICS) for a plurality of users from communication records by using a variable time window, and checking an interactive communication sequence pattern (ICSP) that is an interactive communication sequence frequently generated from among the checked interactive communication sequence is provided.

DETAILED DESCRIPTION OF THE EMBODIMENTS

Figure 1:
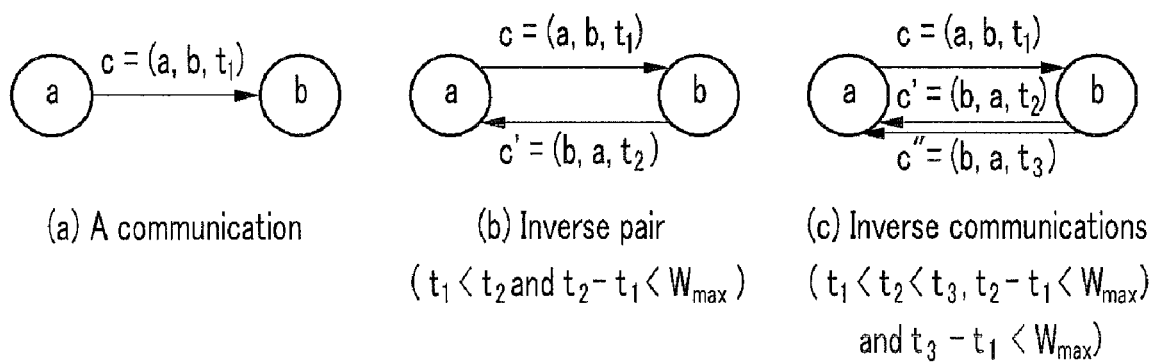
FIG. 1 describes the definition of "communication" and "inverse communication" used in the current specification.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise", and variations such as "comprises" and "comprising", will be understood to imply the inclusion of stated elements but not the exclusion of any other elements. In addition, the terms "-er", "-or", and "module" described in the specification mean units for processing at least one function and operation and can be implemented by hardware components, software components, or combinations thereof.

The terms to be used in the specification will now be described.

FIG. 1 describes the definition of "communication" and "inverse communication" used in the current specification.

In the specification, "communication C" represents an event for a user a to transmit a message to a user b at a time t, and it is denoted as (a, b, t). In this instance, a is a communication sender(c), b is a communication receiver(c), and t means a generation time(c). FIG. 1A shows communication for the user a to transmit a message to the user b at the time t1.

"Inverse communication" is defined to be a case in which sender(c) receiver(c'), receiver(c)=sender(c'), and |time(c')−time(c)|≦Wmax in the two communications c and c'. In this instance, the maximum time window Wmax is a reference value for determining that the contents of c and c' are irrelevant to each other when it is satisfied that |time(c')−time(c)|>Wmax.

"Inverse pair" indicates a sequence pair (c, c') of two communications c and c' in which the time(c') is greater than the time(c), and the two communications c and c' have an inverse communication relation with each other, and the inverse pair is shown as InvP(c, c'). FIG. 1B shows an inverse pair InvP(c, c') configured by the two communications c and c' having an inverse communication relation with each other.

A plurality of inverse communications can be provided to one communication, and FIG. 1C shows the case in which the communication c has two inverse communications c' and c". The communication c configures an InvP(c, c") with the inverse communications c' and c" and the inverse pair InvP(c, c').

Figure 2:
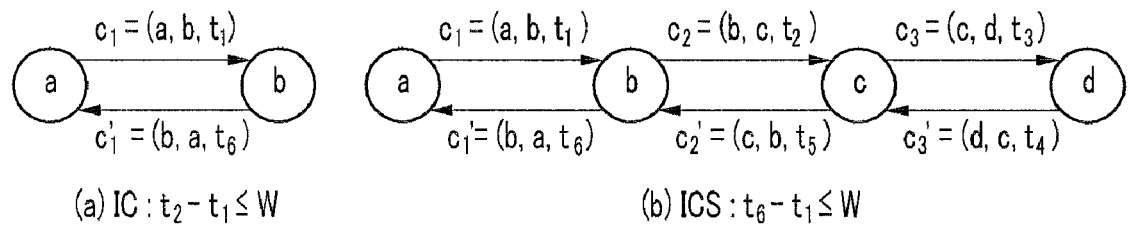
FIG. 2 describes the definition of "interactive communication" and "interactive communication sequence" used in the current specification.

FIG. 2 describes the definition of "interactive communication" and "interactive communication sequence" used in the current specification.

In the specification, "interactive communication (IC)" represents a sequence pair (c, c') in which the communication c and the inverse communication c' satisfies 0<time(c')−time(c)≦W, when the Wmax is given and the time window W satisfying W<Wmax is given, and it is denoted as IC(a, b). In this instance, a and b respectively indicate a sender(c) and a receiver(c).

That is, the "interactive communication (IC)" represents an inverse pair InvP(c, c') when a communication c is generated and the inverse communication c' of the communication c is generated within the given time window. In FIG. 2A, when a difference between the generation times of the two communications c1 and c1' is less than or equal to the given time window, (i.e., t2−t1≦W), (c, c') becomes IC(a, b).

FIG. 2B describes the definition of an "interactive communication sequence", When Wmax and the time window W satisfying W<Wmax are given for six communications (c1, c2, c3, c3', c2', c1') and it is given that t1<t2<t3<t4<t5<t6 and t6−t1≦W, the communication sequences <c1, c2, c3, c3', c2', c1'> become an interactive communication sequence (ICS).

In this instance, the interactive communication sequence is shown as ICS(a, d), a represents a user source (ICS(a, d)) for starting first communication of the communication sequence, and d means a user destination (ICS(a, d)) that is the most distant from the source in the communication sequence.

Since it is given that t2<t3<t4<t5 and t5−t2≦W because of the condition of ICS(a, d), the communication sequence <c2, c3, c3', c2'> becomes an interactive communication sequence ICS(b, d). Therefore, the communication sequence <c1, c2, c3, c3', c2', c1'> of FIG. 2B can be indicated as a communication sequence <c1, ICS(b, d), c1'> meaning the ICS(a, d). That is, the ICS can include another ICS, and the included ICS is called a sub-ICS. That is, ICS(b, d) is the sub-ICS of the ICS(a, d).

The length of the ICS <c1, c2, . . . , cn, cn', . . . , c2', c1'> is defined to be n. The length of the ICS corresponds to the number of communications that are performed before a response message is initially transmitted within the ICS. For example, in FIG. 2B, the length of ICS(a, d) is 3. The ICS having the length 1 becomes a sequence pair of two communications being inverse communications with each other, and the sequence pair is defined in a like manner of the IC. Therefore, the ICS having the length 1 becomes the IC, and the IC becomes the ICS, the most basic unit. That is, the "interactive communication" of FIG. 2A becomes the ICS with the length 1.

A generation time of the first communication of the ICS(a, d) and a generation time of the last communication are respectively given as a start-time(ICS(a, d)) and an end-time(ICS(a, d)), and the end-time(ICS(a, d))–start-time(ICS(a, d)) becomes a response time of the ICS(a, d).

For example, in FIG. 2B, the start-time (ICS(a, d)) is the time(c1), the end-time (ICS(a, d)) is the time(c1'), and the response of ICS(a, d) is the time (c1')–time(c1).

The ICS can be shown by the communication sequence <c1, c2, c3, c3', c2', c1'> having sequentially displayed the communication configuring the ICS, and can also be shown by a user sequence having displayed the order of message transmission between users. In detail, the communication sequence in FIG. 2B is <c1, c2, c3, c3', c2', c1'> and the user sequence is a→b→c→d→c→b→a.

Also in the specification, the "interactive communication sequence pattern (ICSP)" represents that the same interactive communication sequence (ICS) is repeated more than a predetermined number of time from among the interactive communication sequences (ICS). That is, a frequently generated interactive communication sequence from among the interactive communication sequences (ICS) is the interactive communication sequence pattern (ICSP).

Figure 3:
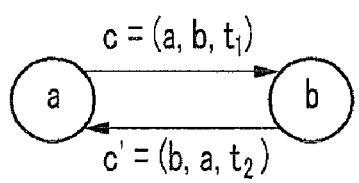
FIG. 3 describes a "time window" of an interactive communication sequence.
Figure 3:
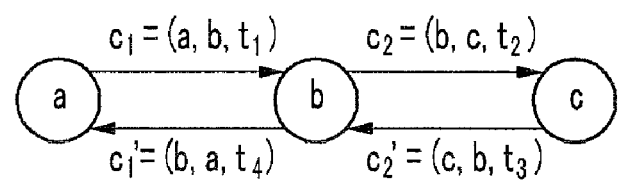

FIG. 3 describes a "time window" of an interactive communication sequence.

FIG. 3A provides α as a value of the time window used for determining whether the inverse pair is an IC. The time window value α is defined as follows.

When the user a transmits a message to the user b at the time t1 and it is then determined that the time required until receiving a response from the user b is not greater than α in general, α is used as a value of the time window W and is used as a size of the basic time window. That is, the size of the basic time window α is a limit time for the user b to finish a task performance so that the InvP(c, c') may become an interactive communication (IC).

In the communication sequence in FIG. 3B, when the user a transmits a message to the user b, the user b then does not respond to the user a after performing his own task. The user b transmits a message for requesting another task to the user c while performing a task relating to the message of the user a.

When the user c performs a task relating to the message received from the user b and then responds to the user b within α, <c2, c2'> becomes the IC and the ICS simultaneously. The user b receives a response from the user c, finishes his task, and transmits a response message to the user a.

In this instance, <c2, c2'> is finished within α and becomes the ICS, and <c1, c2, c2', c1'> may not be responded to within α since the task performance time by the user b is added. In this case, the time window W for becoming the ICS is determined by considering the time for the task of the user c and the time for the task of the user b.

That is, 2α which is the sum of the time α for the task of the user b and the basic time window α becomes the time window W for the ICS. That is, the time window W is extended. Hence, when the user a received the response from the user b within 2α after transmitting the message to the user b, the communication sequence <c1, c2, c2', c1'> becomes ICS.

However, since the task performance of the user b and the task performance of the user c can be performed in parallel, both tasks can be finished within α. In this case, the time window W need not be extended. That is, when <c1, c2, c2', c1'> is responded within α, <c1, c2, c2', c1'> becomes the ICS without considering the extension of the time window.

That is, <c2, c2'> must become ICS so that the communication sequence <c1, c2, c2', c1'> in FIG. 3B may become the ICS. In this instance, the time window W value is α so that <c2, c2'> may become the ICS. When the time (time (c1')–time(c1)) used until the user a receives a response from the user b is less than or equal to α, <c1, c2, c2', c1'> becomes the ICS and the time window W value of <c1, c2, c2', c1'> is α. When time (c1')–time(c1) is greater than α, the time window W value of <c1, c2, c2', c1'> becomes 2α, and when time (c1')–time(c1) is less than or equal to W=2α, <c1, c2, c2', c1'> becomes the ICS.

A data processing method and system according to an exemplary embodiment of the present invention will now be described with reference to the drawings.

Figure 4:
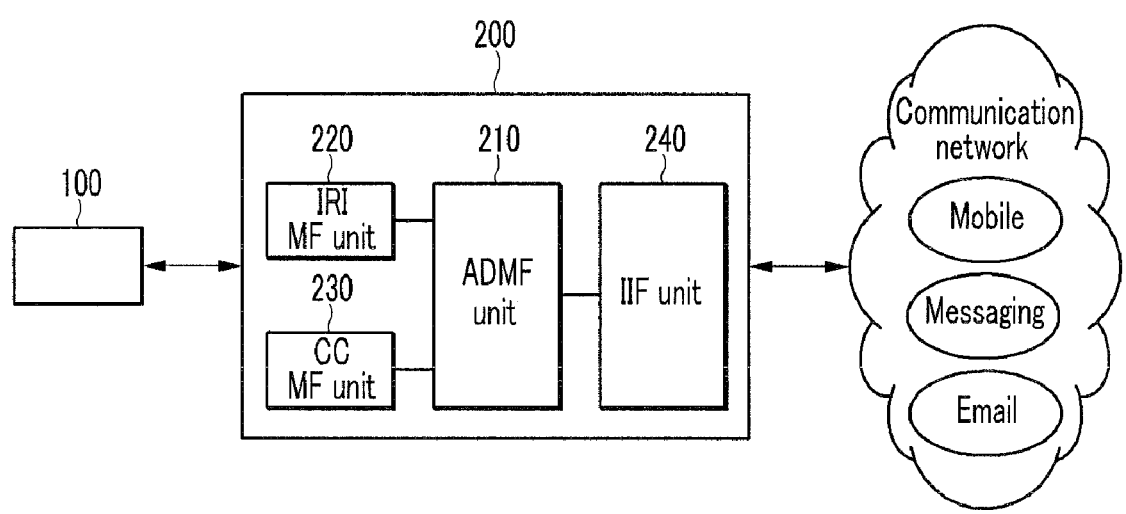
FIG. 4 is a schematic diagram of an entire network according to an exemplary embodiment of the present invention.

FIG. 4 is a schematic diagram of an entire network according to an exemplary embodiment of the present invention.

Referring to FIG. 4, an entire network according to an exemplary embodiment of the present invention includes a data processing system 100 and an electronic surveillance system 200. Respective elements shown in FIG. 4 will now be described.

The data processing system 100 is a system of an LEA, and it requests legally allowed surveillance information on a person to be watched from the electronic surveillance system 200. Here, surveillance information includes a surveillance target, a surveillance period, and a type of monitoring data.

When receiving a communication record on the surveillance target from the electronic surveillance system 200, the data processing system 100 checks an interactive communication sequence pattern (ICSP) that is frequently generated between communication objects by using the received communication record.

The electronic surveillance system 200 is in the progress of standardization by the European telecommunications standards institute (ETSI), and transmits the communication record of the surveillance target requested by the data processing system 100 to the data processing system 100. The electronic surveillance system 200 includes an internal intercept function (IIF) unit 240, medication function (MF) units 220 and 230, and an administration function (ADMF) unit 210. The respective elements of the electronic surveillance system 200 will now be described.

When receiving a surveillance request from the data processing system 100, the ADMF unit 210 transmits surveillance information to the IIF unit 240, and controls and manages operations of the IIF unit 240 and the MF units 220 and 230.

The IIF unit 240 is located at a network node such as a router, a wired/wireless communication repeater, a web server, or a service user authentication system and monitors users' communication records (IRI) and communication contents (CC). Also, the IIF unit 240 extracts monitoring information on the surveillance target, and transmits the communication records (IRI) and the communication contents information (CC) to an IRI MF unit 220 and a CC MF unit 230.

The MF units 220 and 230 include the IRI MF unit 220 and the CC MF unit 230, receive monitoring data collected by the IIF unit 240, and transmit them to the data processing system 100.

Figure 5:
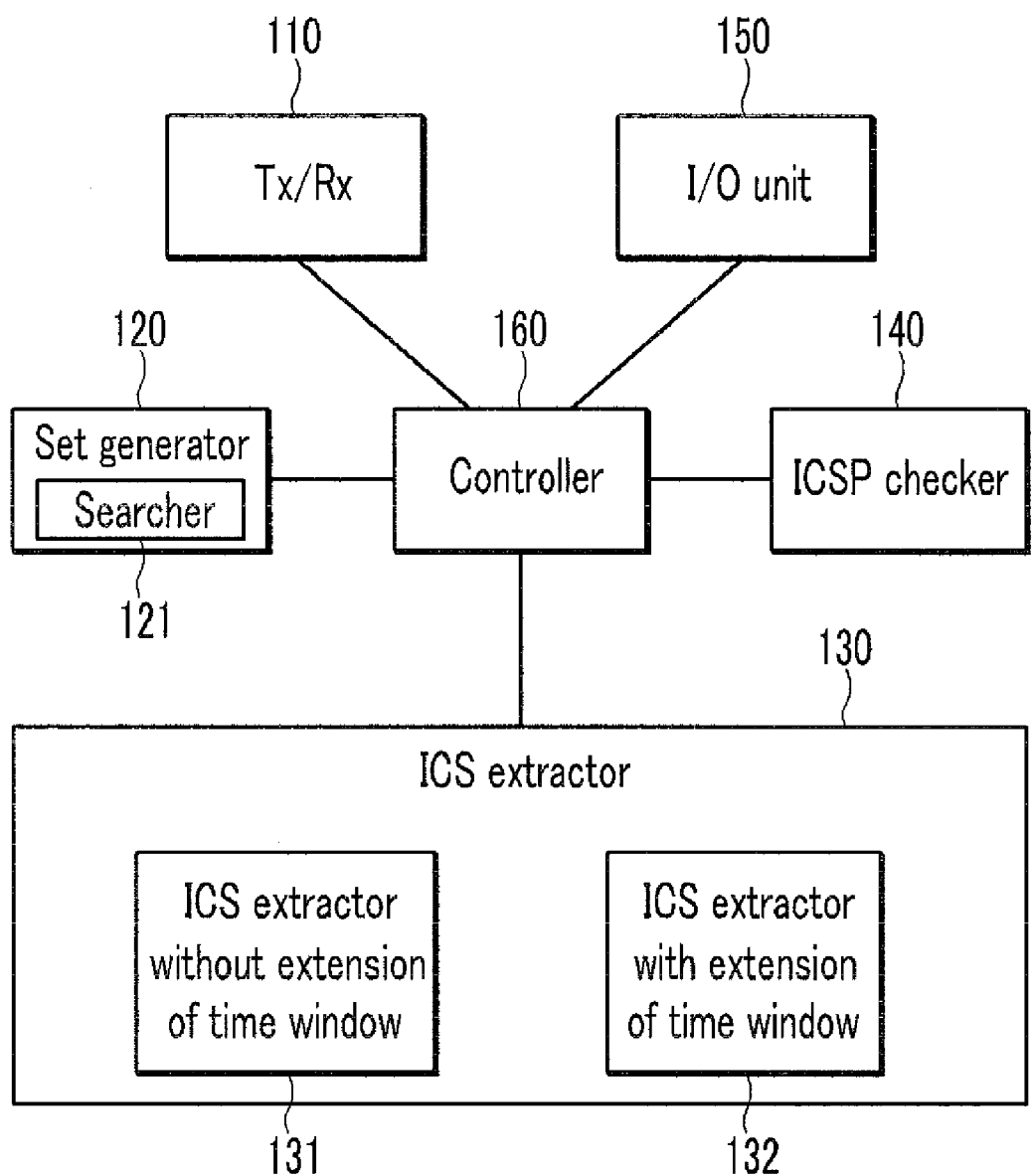
FIG. 5 is a block diagram of a data processing system according to an exemplary embodiment of the present invention.

FIG. 5 is a block diagram of a data processing system 100 according to an exemplary embodiment of the present invention.

Referring to FIG. 5, the data processing system 100 includes a transmitter/receiver 110, a set generator 120, an ICS extractor 130, an ICSP checker 140, an input/output unit 150, and a controller 160. The respective elements in FIG. 5 will now be described.

The transmitter/receiver 110 requests legally allowed surveillance information on the person to be watched from the electronic surveillance system 200. Also, the transmitter/receiver 110 receives a communication record on the surveillance target from the electronic surveillance system 200.

The set generator 120 includes a searcher 121, and stores inverse pairs provided in the communication record in the interactive communication sequence set (set S (ICS)) or a set of inverse pairs that can be part of the interactive communication sequence (ICS) (candidate set S (C-ICS)).

In this instance, the set S (ICS) represents a set of inverse pairs satisfying the condition of the interactive communication sequence (ICS), and the candidate set S (C-ICS) represents a set of inverse pairs that do not satisfy the condition of the interactive communication sequence (ICS) but can be part of the interactive communication sequence (ICS).

The searcher 121 searches the inverse pairs in the communication record.

The ICS extractor 130 includes an ICS extractor 131 without extension of a time window and an ICS extractor 132 with extension of a time window, and extracts an interactive communication sequence having a length other than 1.

The ICS extractor 131 without extension of a time window combines the inverse pairs that are included in the set S (ICS) generated by the set generator 120 to generate an interactive communication sequence (ICS) having a length other than 1, and adds the generated interactive communication sequence (ICS) to the set S (ICS). That is, the ICS extractor 131 without extension of a time window checks the interactive communication sequence (ICS) that can be extracted without extension of a time window.

In detail, the ICS extractor 131 without extension of a time window checks a new interactive communication sequence in which an interactive communication sequence included in the set S (ICS) establishes another interactive communication sequence included in the set S (ICS) as a sub interactive communication sequence (sub-ICS), and adds the newly generated interactive communication sequence (ICS) to the set S (ICS).

The ICS extractor 132 with extension of a time window combines the inverse pair that is included in the candidate set S (C-ICS) generated by the set generator 120 and the interactive communication sequence (ICS) that is included in the set S (ICS) (here, the set S (ICS) to which an interactive communication sequence (ICS) that is newly generated by the ICS extractor 131 without extension of a time window is added) that is finally determined by the ICS extractor 130 without extension of a time window to generate an interactive communication sequence (ICS) having a length other than 1, and adds the generated interactive communication sequence (ICS) to the set S (ICS).

That is, the ICS extractor 132 with extension of a time window checks the interactive communication sequence (ICS) that can be extracted by extending the time window.

In detail, the ICS extractor 132 with extension of a time window checks a new interactive communication sequence in which the inverse pair included in the candidate set S (C-ICS) has another interactive communication sequence included in the set S (ICS) as a sub interactive communication sequence (sub-ICS), and adds the newly generated interactive communication sequence (ICS) to the set S (ICS).

The ICSP checker 140 calculates the repeated number of the interactive communication sequence (ICS) of the set S (ICS) (i.e., the set S (ICS) to which the interactive communication sequence (ICS) newly generated by the ICS extractor 132 with extension of a time window) finally determined by the ICS extractor 132 with extension of a time window, and checks an interactive communication sequence pattern (ICSP) that is an interactive communication sequence (ICS) repeated for more than a predetermined number of times.

The input/output unit 150 outputs the ICSP checked by the ICSP checker 140.

The controller 160 controls operations of the transmitter/receiver 110, the set generator 120, the ICS extractor 130, the ICSP checker 140, and the input/output unit 150.

A data processing method according to an exemplary embodiment of the present invention will now be described with reference to drawings.

Figure 6:
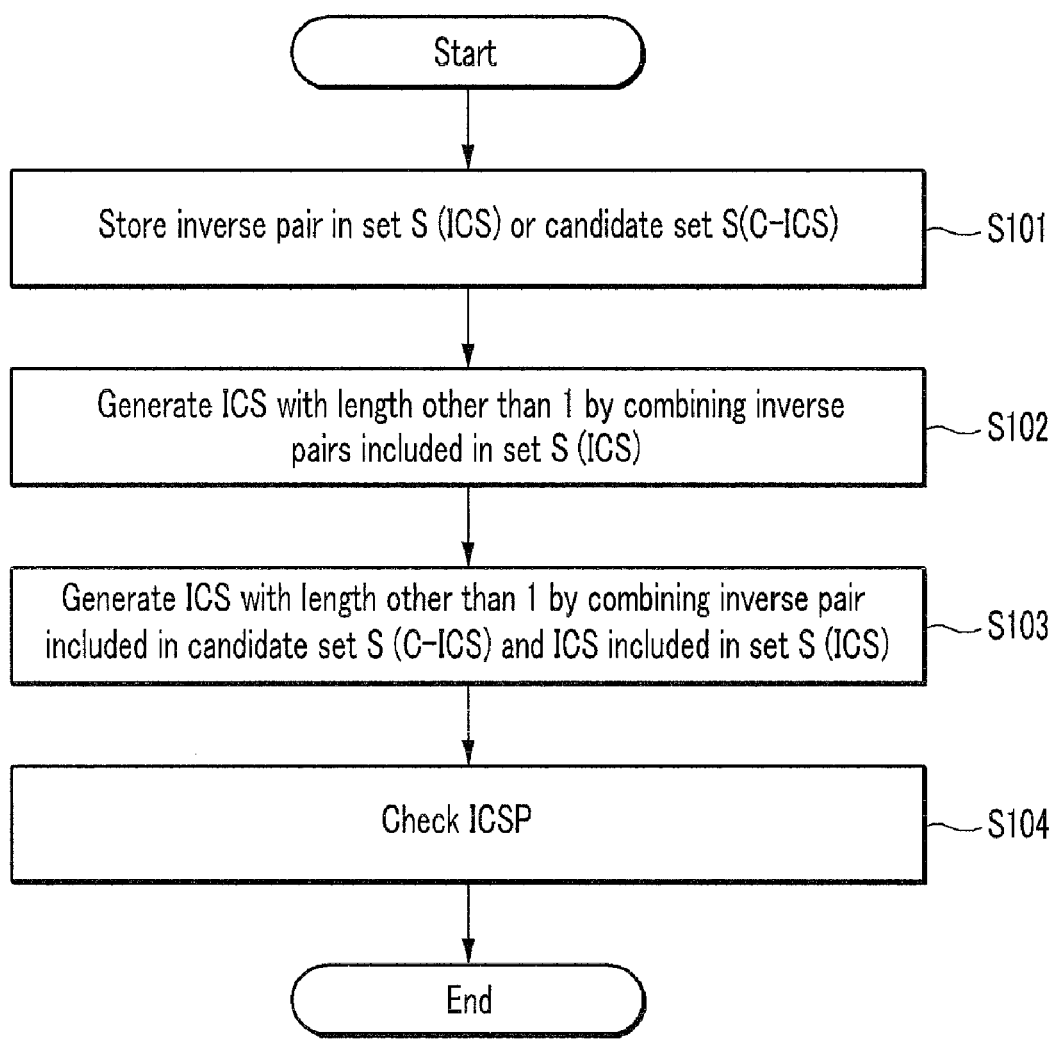
FIG. 6 is a flowchart of a method for finding an interactive communication sequence pattern according to an exemplary embodiment of the present invention.

FIG. 6 is a flowchart of a method for finding an interactive communication sequence pattern (ICSP) according to an exemplary embodiment of the present invention.

Referring to FIG. 6, the data processing system 100 searches inverse pairs provided in the communication record, and stores the searched inverse pairs in the interactive communication sequence set (set S (ICS)) or the candidate set (set S (C-ICS)) of an inverse pair that can be part of the interactive communication sequence (ICS) (S101).

The data processing system 100 combines the inverse pairs included in the set S (ICS) to generate an interactive communication sequence (ICS) having the length other than 1, and adds the generated interactive communication sequence (ICS) to the set S (ICS) (S102). That is, in the S102, the data processing system 100 checks the interactive communication sequence (ICS) that can be extracted without extending the time window.

The data processing system 100 combines the inverse pair included in the candidate set S (C-ICS) and the interactive communication sequence (ICS) included in the set S (ICS) to generate an interactive communication sequence (ICS) having the length other than 1, and adds the generated interactive communication sequence (ICS) to the set S (ICS) (S103). That is, in the S103, the data processing system 100 checks the interactive communication sequence (ICS) that can be extracted by extending the time window.

In detail, the data processing system 100 checks a new interactive communication sequence (ICS) in which the inverse pair included in the candidate set S (C-ICS) has another interactive communication sequence (ICS) included in the set S (ICS) as a sub interactive communication sequence (sub-ICS), and adds the newly generated interactive communication sequence (ICS) to the set S (ICS).

The data processing system 100 calculates the repeating number of the interactive communication sequence (ICS) of the set S (ICS), and checks the interactive communication sequence pattern (ICSP) that is an interactive communication sequence (ICS) repeated for more than a predetermined number of times (S104).

Figure 7:
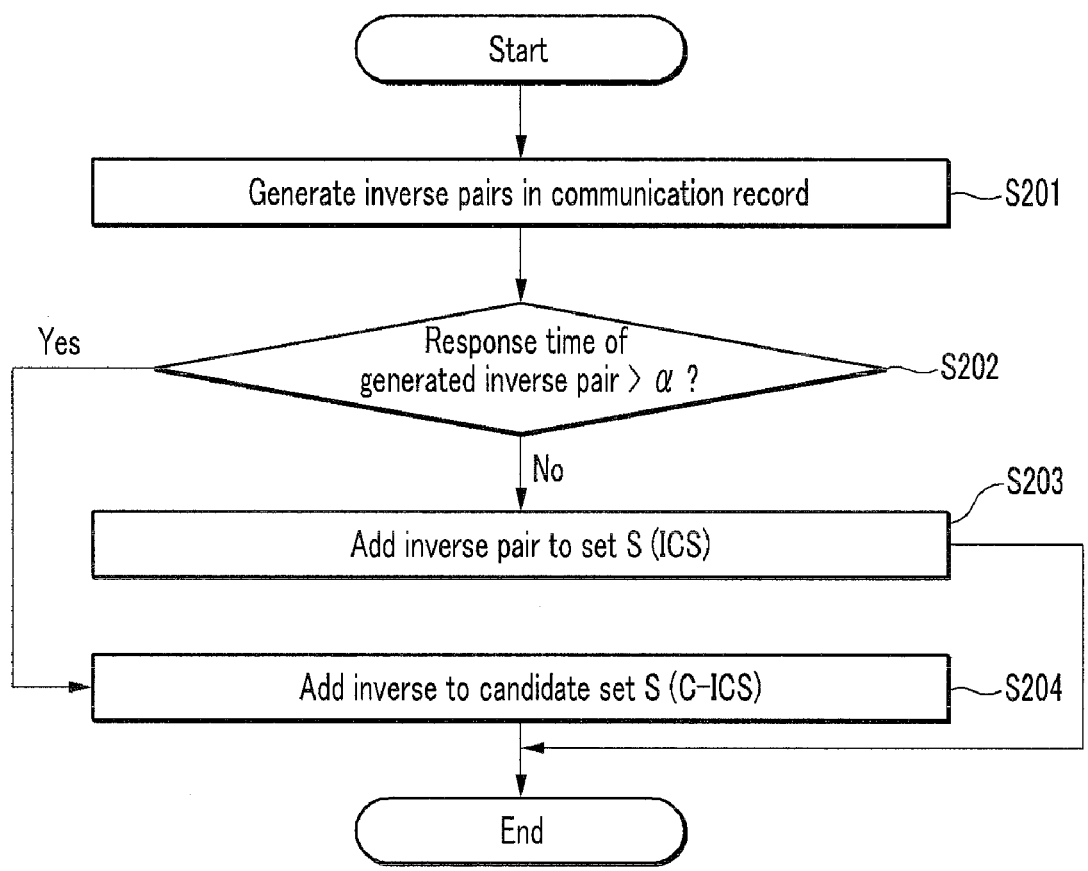
FIG. 7 is a flowchart of a method for performing S101 according to an exemplary embodiment of the present invention.

FIG. 7 is a flowchart of a method for performing S101 according to an exemplary embodiment of the present invention.

Referring to FIG. 7, the data processing system 100 combines communications that are inverse communications with each other in the communication record to generate available inverse pairs (S201).

The data processing system 100 determines whether the response time (time(c')−time(c)) of the generated inverse pair InvP(c, c') is greater than α (S202).

When the response time (time(c')−time(c)) of the inverse pair InvP(c, c') is less than or equal to α, the data processing system 100 adds the corresponding inverse pair to the set S(ICS) that is an interactive communication sequence set (S203).

However, when the response time (time(c')−time(c)) of the inverse pair InvP(c, c') is greater than α, the data processing system 100 adds the corresponding inverse pair to the candidate set S (C-ICS), that is a set of inverse pairs that can be part of the interactive communication sequence (ICS) (S204).

The S101 according to an exemplary embodiment of the present invention can be expressed with a pseudo random code as follows.

```
Input
    D: Communication log
    a: basic time window
    W_max: maximum window
Output
    S_ICS: a set of interactive communications
    S_C-ICS: a set of inverse pairs that are not interactive
        communication
Procedure
01: S_ICS ← { }
02: S_C-ICS ← { }
03: foreach log <x, y, t> in D
04:     foreach <y, x, t'> in D such that <y, x, t'> is an inverse of
            <x, y, t> and 0 < t' − t ≦ W_max
05:         if t' − t ≦ a
06:             ICS(x, y) ← convert (<x, y, t>, <y, x, t'>) into an ICS
07:             S_ICS ← S_ICS ∪ {ICS(x, y)}
08:         else
09:             InvP(<x, y, t>, <y, x, t'>) ← convert
                    (<x, y, t>, <y, x, t'>) into an inverse pair
10:             S_C-ICS ← S_C-ICS ∪ {InvP(<x, y, t>, <y, x, t'>)}
11:         end if
12:     end foreach
13: end foreach
```

Figure 8:
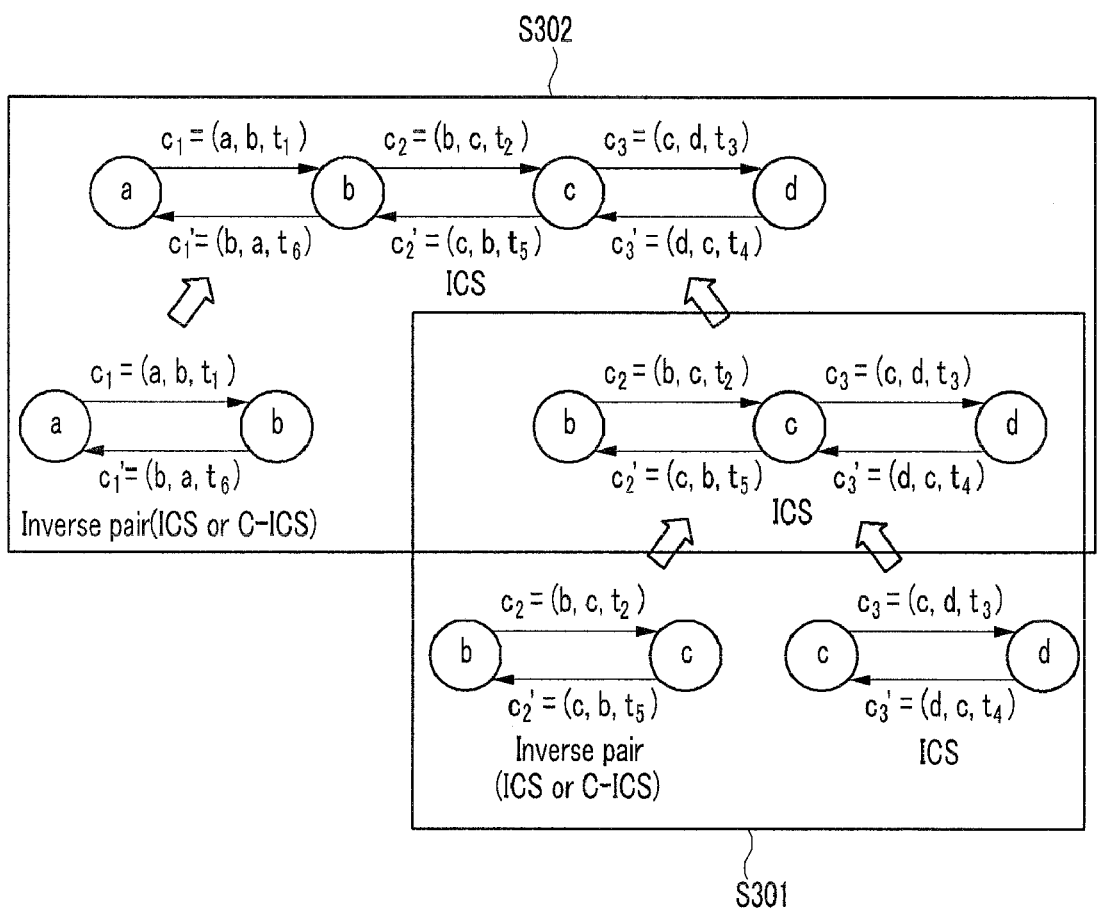
FIG. 8 is a schematic view for generating a new ICS in S102 or S103.

FIG. 8 is a schematic view for generating a new ICS in S102 or S103.

The data processing system 100 generates a new ICS by combining the inverse pair with the length 1 and the ICS with no limits of the length.

In S102, a new ICS is generated by combining the ICS with the length 1 included in the set S (ICS) and the ICS with no limits of the length (the ICS with the length 1 and the ICS with the length other than 1 generated by combining ICSs).

In S103, a new ICS is generated by combining the inverse pair with the length 1 included in the candidate set S (C-ICS) and the ICS with no limits of the length (the ICS with the length 1 and the ICS with the length other than 1 generated by combining ICSs).

Referring to FIG. 8, the data processing system 100 generates an ICS with the length 2 by combining the inverse pair with the length 1 and the ICS with the length 1 (S301). The data processing system 100 generates an ICS with the length 3 by combining the ICS with the length 2 generated in S301 and the inverse pair with the length 1 (S302).

In this instance, the inverse pair with the length 1 is provided on the left side of the combination, and the ICS with no limits of the length is provided on the right side of the combination.

The method for generating a new ICS in S102 and S103 will now be described in detail.

A condition for generating a new ICS in S102 according to an exemplary embodiment of the present invention will be as follows.

The right user for the ICS with the length 1 provided on the left side of the combination must correspond to the left user for the ICS with the limits of the length (e.g., the user c in S301 of FIG. 8) (Condition 1).

Also, the ICS <c, c'> with the length 1 provided on the left side of the combination and the ICS(x, y) with no limits of the length provided on the right side of the combination must satisfy the condition in which it is given that start-time (ICS (x, y))>time(c) and end-time (ICS(x, y))<time(c') (Condition 2). For example, in the case of S301, it must be satisfied that t3>t2 and t5>t4.

Since the ICSs included in the set S (ICS) have the response times within the basic time window α, a new ICS can be generated by combining two ICSs when the above-noted conditions are satisfied. For example, when it is given in FIG. 8 that t6−t1<α, t5−t2<α, t4−t3<α, and t1<t2<t3<t4<t5<t6, an ICS(b, d) and an ICS(a, d) are generated.

The set S (ICS) after S102 is finished represents a set of storing ICSs with a response time that is less than or equal to the basic time window α.

The S102 according to an exemplary embodiment of the present invention can be expressed with the pseudo random code as follows.

```
Input
    a: basic time window
    minsup: minimum frequency
    S_ICS: a set of interactive communications
Output
    S_ICS: a set of interactive communications
Procedure
01: S_SimpleICS ← S_ICS
02: S_NewICS ← S_ICS
03: while (S_NewICS is not empty )
04:     S_Seed ← S_NewICS
05:     S_NewICS ← { }
06:     foreach IC (c, c') in S_SimpleICS
07:         if (c, c') and an ICS(a, d) in S_Seed can create a new ICS
08:             S_NewICS ← S_NewICS ∪ { <c, ICS(a, d), c'> }
09:         end if
10:     end foreach
11:     foreach ICS(s, d) in S_NewICS
12:         S_ICS ← S_ICS ∪ { ICS(s, d) }
13:     end foreach
14: end while
```

A condition for generating a new ICS in S103 according to an exemplary embodiment of the present invention will be as follows.

In S103 according to an exemplary embodiment of the present invention, a new ICS is generated by combining the inverse pair with the length 1 included in the candidate set S (C-ICS) and the ICS with no limits of the length (the ICS with the length 1 and the ICS with the length other than 1 generated by combining ICSs).

A difference with the case of S102 for generating a new ICS is in that not the ICS but the inverse pair with the length 1 included in the candidate set S (C-ICS) is provided on the left side of the combination in S103. Also, the ICS provided on the right side of the combination in S103 is a set S (ICS) including the ICS generated in S102.

A condition for generating a new ICS in S103 according to an exemplary embodiment of the present invention will be as follows.

The right user for the ICS with the length 1 provided on the left side of the combination must correspond to the left user for the ICS with no limits of the length (e.g., user c in the case of S301 in FIG. 8) (Condition 1).

Also, the inverse pair <c, c'> provided on the left side of the combination and the ICS(x, y) provided on the right side thereof must satisfy the condition in which it is given that start-time (ICS(x, y))>time(c) and end-time (ICS(x, y))<time (c') (Condition 2).

Also, time(c')−time(c) must be less than or equal to a time window of ICS(x, y)+α (Condition 3).

When the three conditions are satisfied, <c, ICS(x, y), c'> becomes a new ICS. In this instance, in the case of W (time window) for time(c')−time(c)≦ICS(x, y), W of the new ICS has the same value as the ICS(x, y), and in the case of W for ICS(x, y) of W≦time(c')−time(c)≦α+ICS(x, y), W of the new ICS becomes W of α+ICS(x, y).

For example, in FIG. 8, when it is given that t6−t1<3α, t5−t2<2α, t4−t3<α, and t1<t2<t3<t4<t5<t6, ICS(b, d) becomes the ICS in which W is 2α, and the ICS(a, d) becomes the ICS in which W is 3α. However, when it is given that t6−t1>2α, t5−t2<α, t4−t3<α, and t1<t2<t3<t4<t5<t6, ICS(b, d) becomes the ICS in which W is α, and <c1, c2, c3, c3', c2', c1'> cannot become the ICS since time (c1')−time c1 is greater than a (time window of ICS(b, d))+α.

The S103 according to an exemplary embodiment of the present invention can be expressed with the pseudo random code as follows.

```
Input
    a: basic time window
    minsup: minimum frequency
    S_ICS: a set of interactive communications
    S_C-ICS: a set of inverse pairs that are not interactive
        communication
Output
    S_ICS: a set of interactive communications
Procedure
01: S_NewICS ← S_ICS
02: while (S_NewICS is not empty )
03:     S_Seed ← S_NewICS
04:     S_NewICS ← { }
05:     foreach communication (c, c') in S_C-ICS
06:         if (c, c') and an ICS(a, d) in S_Seed can create a new ICS by
            using time window expansion
07:             S_NewICS ← S_NewICS ∪ { <c, ICS(a, d), c'> }
08:         end if
09:     end foreach
10:     foreach ICS(s, d) in S_NewICS
11:         S_ICS ← S_ICS ∪ { ICS(s, d) }
12:     end foreach
13: end while
```

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for processing data comprising:
(a) storing, by a data processing system, an inverse pair provided in a communication record in an interactive communication sequence set or a candidate set that is a set of inverse pairs that can be part of the interactive communication sequence;
(b) generating, by the data processing system an interactive communication sequence having a length other than 1 by combining interactive communication sequences included in the interactive communication sequence set; and
(c) generating, by the data processing system an interactive communication sequence having a length other than 1 by combining the inverse pair included in the candidate set and one of the interactive communication sequence included in the interactive communication sequence set of (a) and the interactive communication sequence generated in (b).

2. The method of claim 1, further comprising
(d) extracting an interactive communication sequence pattern (ICSP) that is a frequently generated interactive communication sequence based on the number of times of repeating the interactive communication sequence included in the interactive communication sequence set of (a), the interactive communication sequence generated in (b), and the interactive communication sequence generated in (c).

3. The method of claim 2, wherein
the (d) includes:
calculating the number of times of repeating the interactive communication sequence included in the interactive communication sequence set of (a), the interactive communication sequence generated in (b), and the interactive communication sequence generated in (c); and
extracting the interactive communication sequence that is repeated greater than a predetermined number of times as an interactive communication sequence pattern (ICSP).

4. The method of claim 3, wherein
the (a) includes:
searching an inverse pair provided in the communication record;
determining whether a response time of the inverse pair is greater than a basic time window;
storing the inverse pair in the interactive communication sequence set when the response time of the inverse pair is less than or equal to the basic time window; and
storing the inverse pair in the candidate set when the response time of the inverse pair is greater than the basic time window.

5. The method of claim 4, wherein
in (b) and (c),
an interactive communication sequence having the length other than 1 is generated by combining the inverse pair having the length 1 and an interactive communication sequence having no limits of the length.

6. The method of claim 5, wherein
the interactive communication sequence having the length other than 1 in (b) is generated by combining the interactive communication sequence included in the interactive communication sequence set of (a) and the interactive communication sequence having no limits of the length.

7. The method of claim 6, wherein
the interactive communication sequence having the length other than 1 generated in (b) is determined based on a matched state of communication objects and a communication generation time.

8. The method of claim 5, wherein
the interactive communication sequence having the length other than 1 in (c) is generated by combining the inverse pair included in the candidate set of (a) and the interactive communication sequence having no limits of the length.

9. The method of claim 8, wherein
generating of the interactive communication sequence having the length other than 1 in (c) is determined based on a matched state of communication objects, a communication generation time, and a time window condition.

10. A method for processing data comprising:
(a) extracting, by a data processing system, an inverse pair provided in a communication record, determining whether a response time of the inverse pair is less than a basic time window, and extracting an interactive communication sequence having the length 1;
(b) extracting, by a data processing system, an interactive communication sequence having the length other than 1 by combining the inverse pairs while the time window is not extended;
(c) extracting, by a data processing system, an interactive communication sequence having the length other than 1 by extending the time window and combining the inverse pairs; and
(d) extracting, by a data processing system, an interactive communication sequence pattern (ICSP) that is a frequently generated interactive communication sequence based on the numbers of times of respectively repeating interactive communication sequences that are extracted in (a), (b), and (c).

11. The method of claim 10, wherein,
in (b) and (c),
the interactive communication sequence having the length other than 1 is generated by combining the inverse pair having the length 1 and the interactive communication sequence having no limits of the length.

12. The method of claim 11, wherein
the interactive communication sequence having the length 1 extracted in (b) is generated by combining the interactive communication sequence having the length 1 extracted in (a), and is determined based on a matched state of communication objects and a communication generation time.

13. The method of claim 12, wherein
the interactive communication sequence having the length other than 1 extracted in (c) is determined based on a matched state of communication objects, a communication generation time, and a time window condition.

14. A system for processing data comprising:
a data processing system, comprising:
a set generator for generating an interactive communication sequence set that is a set of interactive communication sequences (ICSs) and a candidate set that is a set of inverse pairs that can be part of the interactive communication sequence by using an inverse pair provided in a communication;
an ICS extractor for generating an interactive communication sequence having the length other than 1 based on the interactive communication sequence set and the candidate set generated by the set generator; and
an ICSP checker for extracting an interactive communication sequence pattern (ICSP) that is a frequently generated interactive communication sequence from among interactive communication sequences generated by the ICS extractor.

15. The system of claim 14, wherein
the ICS extractor includes:
an ICS extractor without extension of a time window for generating an interactive communication sequence having the length other than 1 by combining the interactive communication sequences included in the interactive communication sequence set; and
an ICS extractor with extension of a time window for generating an interactive communication sequence having the length other than 1 by combining the inverse pair included in the candidate set and one of the interactive communication sequence included in the interactive communication sequence set and the interactive communication sequence generated by the ICS extractor without extension of a time window.

16. The system of claim 15, wherein
the ICSP checker extracts the interactive communication sequence pattern (ICSP) depending on whether the interactive communication sequences generated by the ICS extractor are repeated more than a predetermined number of times.

17. The system of claim 16, wherein
the set generator includes a searcher for searching an inverse pair provided in the communication record.

18. The system of claim 17, further including:
a transmitter/receiver for receiving the communication record from an electronic surveillance system; and
an input/output unit for outputting an interactive communication sequence pattern (ICSP) checked by the ICSP checker.

* * * * *